United States Patent [19]

Handley

[11] Patent Number: 4,869,891
[45] Date of Patent: Sep. 26, 1989

[54] AMMONIA OXIDATION CATALYST PACK

[75] Inventor: Jack R. Handley, Aylesbury, United Kingdom

[73] Assignee: Johnson Matthey Public Limited Company, London, England

[21] Appl. No.: 136,994

[22] Filed: Dec. 23, 1987

[30] Foreign Application Priority Data

Dec. 23, 1986 [GB] United Kingdom ............... 8630728

[51] Int. Cl.$^4$ .................. B32B 3/04; C01B 21/26
[52] U.S. Cl. .................. 423/403; 428/246; 428/253; 428/289
[58] Field of Search .............. 423/403; 428/246, 253, 428/289

[56] References Cited

U.S. PATENT DOCUMENTS

| 971,149 | 9/1910 | Schick | 423/403 |
|---|---|---|---|
| 4,189,404 | 2/1980 | Keith et al. | 502/527 |
| 4,435,373 | 3/1984 | Knapton et al. | 423/403 |

OTHER PUBLICATIONS

UK Patent Application 2,037,342 A, published, Jul. 9, 1980.
UK Patent Application 2,067,915 A, published, Aug. 5, 1981.

Primary Examiner—Robert L. Stoll
Assistant Examiner—Wayne A. Langel
Attorney, Agent, or Firm—Cushman, Darby & Cushman

[57] ABSTRACT

A catalyst pack (1) for the manufacture of nitric acid by oxidizing ammonia comprises at least one layer (2, 3, 4, 5, 6) of elongate elements made from at least one platinum group metal or alloy and at least one foraminous layer (7, 8) of ceramics material having a coating of one or more platinum group metals or alloys or mixture. In use the catalyst pack has improved conversion efficiencies. The preferred ceramics material comprises either alumina, slicia and boria or zirconia in the form of a cloth.

12 Claims, 1 Drawing Sheet

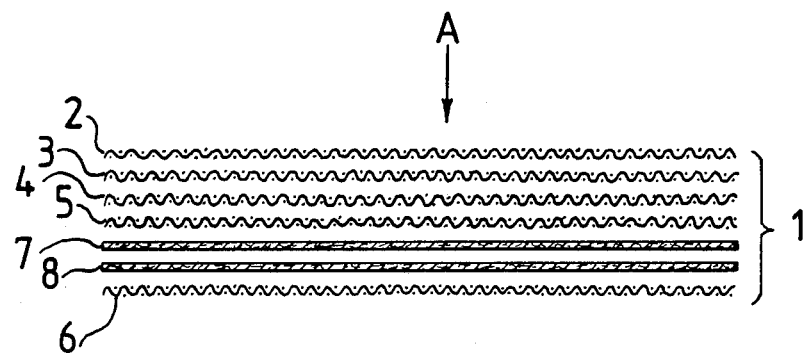

AMMONIA OXIDATION CATALYST PACK

This invention relates to a catalyst pack for the manufacture of nitric oxide by oxidizing ammonia and to a process for the manufacture of nitric oxide by oxidising ammonia in the presence of such a catalyst pack.

Conventionally, in the manufacture of nitric oxide by the oxidation of ammonia, a mixture of air and ammonia at 150° to 300° C. is passed over an oxidation catalyst comprising platinum and 0 to 20 wt% of rhodium and/or 0 to 40 wt% of palladium (based on the weight of the alloy). Such a catalyst preferably comprises platinum and from 0 to 25 wt% of rhodium (based on the weight of the platinum). The catalyst is in the form of an foraminous layer of elongate elements usually in the form of wires fabricated into one or more gauzes. A simplified equation for the process is

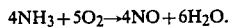

$$4NH_3 + 5O_2 \rightarrow 4NO + 6H_2O.$$

Generally, a nitric oxide manufacturing plant requires between 2 and 40, and preferably between 4 and 25, catalyst gauzes. The number of gauzes is dependent on the pressure and the loading of reactants required to operate effectively. Both platinum and rhodium are expensive so one objective of this invention is to reduce the amount of these elements used in the catalyst. Another objective is to provide a catalyst pack which improves the efficiency of the ammonia oxidation process.

According to a first aspect of the invention there is provided a catalyst pack for the manufacture of nitrix oxide by oxidising ammonia comprising at least one foraminous layer of elongate elements made from at least one platinum group metal or alloy thereof and at least one layer or foraminous ceramics material having a coating of one or more platinum group metals or alloys or mixtures thereof.

According to a second aspect of the invention there is provided a process for the manufacture of nitric oxide by oxidising ammonia in the presence of a catalyst pack which comprises at least one foraminous layer of elongate elements made from at least one platinum group metal or alloy thereof and at least one layer of foraminous ceramics material having a coating of one or more platinum group metals or alloys or mixtures thereof.

Preferred features of the invention will be apparent from the following description and from the subsidiary claims of the specification.

The term 'foraminous layer of elongate elements' is intended to cover any foraminous layer, formed from wires, filaments, fibres, etc and so includes conventional forms of catalyst such as wire gauzes, wire pads, fibre packs, etc. The term 'layer of foraminous ceramics material' is intended to cover any foraminous layer, formed of ceramics material and so includes layers of ceramic fibres which are woven, knitted or felted to form a cloth.

The invention will now be illustrated, merely by way of example, with reference to the drawing which shows a schematic cross-section of one embodiment of a catalyst pack according to the invention.

The drawing shows a catalyst pack 1 suitable for use in the manufacture of nitric oxide. The direction of flow of the mixture of air and ammonia through the catalyst pack 1 is shown by arrow A. The catalyst pack 1 comprises five catalyst layers 2, 3, 4, 5 and 6 composed of wire with a diameter of 0.076 mm woven to produce a gauze of mesh size 1024 apertures $cm^{-2}$ and two ceramic layers 7 and 8. The catalyst pack is arranged with, from the upstream side of the pack to the downstream side thereof, four catalyst layers 2, 3, 4 and 5, two ceramic layers 7 and 8 and a further catalyst layer 6. The wire is made from an alloy of platinum with 10 wt % (based on the weight of alloy) of rhodium. Ceramic layers 7 and 8 are made froma ceramic material comprising 62 wt% alumina, 24 wt% silica and 14 wt% boria. The ceramic material is in the form of fibres with a diameter of 8 to 10 $\mu m$ which are spun into a thread and woven to produce a gauze of mesh size 50 apertures $cm^{-2}$. Such a gauze has an open area of 52.6%. The ceramics material has a coating of 10 wt% platinum (based on the ceramics material) which is deposited by contacting the ceramics material was an aqueous solution of tetrammineplatinnum(II) chloride ($Pt(NH_3)_4Cl_2$) and then drying and then reducing the salt to platinum by heating.

The catalyst gauzes 2, 3, 4, 5 and 6 preferably comprise a platinum/rhodium alloy as described above but may comprise any one or more of the platinum group metals or alloys thereof. Most preferably, the gauzes comprise platinum and from 0 to 20 wt% of rhodium and from 0 to 40 wt% of palladium (based on the weight of the alloy).

The layers of ceramics material preferably comprise intercrossing threads which define the apertures and which may be woven, knitted or felted to give cloth having an open area of from 10 (or preferably 30) to 60%. A simple weave gives a mesh size of from 9 to 1024 apertures $cm^{-2}$. Each thread preferably comprises a body of (for example spun or twisted) fibres, each fibre having a diameter of from 1 to 100 $\mu m$ and especially 1 to 20 $\mu m$. 1 $\mu m$ is $10^{-6}m$.

The ceramics should be stable at temperatures of from 800° to 1200° C. and be inert to the metals of the platinum group, especially platinum, rhodium and palladium. Suitable ceramics include one or more oxides, borides, carbides, silicides, nitrides and/or silicates of aluminium, silicon, zirconium, boron, magnesium, titanium, yttrium, beryllium, thorium, manganese, lanthanum, scandium, calcium, uranium, chromium, niobium, hafnium, or any combination of these. A preferred ceramics composition comprises alumina, 0 to 30 wt% (preferably 0 to 25 wt%) silica and 0 to 15 wt% boria. It is particularly preferred to use a ceramics composition with a silica content as low as possible as silica promotes formation of rhodium oxide. For this reason, the most preferred silica content is from 0 to 25 wt%. Another preferred material is zirconia which has been found to be relatively inert to platinum.

The coating of at least one platinum group metal onto the ceramics material can be continuous or discontinuous. The coating may be of any one or more of the platinum group metals or alloys or mixtures thereof. Preferably, the coating is of platinum, palladium or rhodium or alloys or mixtures thereof. Preferably the coating is deposited onto the ceramics material by contacting the ceramics material with a solution containing one or more platinum group metal salts and then drying the material and reducing the salt to platinum group metals. The coating produced by this method may comprise 1.5–70 wt% (based on the ceramics material). Preferably, the coating comprises platinum 3.0–30 wt% and/or palladium 3–30 wt% and/or rhodium 1–10 wt% (based on the ceramics material). Alternatively, the coating may be deposited by vapour deposition or sputtering.

The coating weight can be considerably reduced if it is formed by vapor deposition or sputtering since these methods produce a coating made up of much finer particles than the plating process described above. A coating formed by vapour deposition or sputtering may thus comprise less than 1.5 wt% (based on the ceramic materials). If the layers of the catalyst upstream of the ceramic layers comprise a source of palladium, for instance if they comprise a platinum/palladium alloy, this will deposit on the ceramic layers during use of the catalyst pack. The coating on the ceramic layers may thus be produced in situ.

The layers of ceramics material are preferably positioned in the downstream portion of the pack as described. However, they may also be positioned in the upstream portion of the pack in which case the coating weight of the platinum group metals would be towards the upper end of the quoted range in view of the increased activity in that portion of the pack.

The invention is further illustrated by the following Examples 1-17 and comparative Examples A, B, C and D.

EXAMPLES 1 TO 17 AND COMPARATIVE EXAMPLES A, B, C AND D

These examples illustrate how the efficiency of the ammonia oxidation process over the catalyst pack is improved when the catalyst pack contains one or more ceramic layers coated with platinum group metal.

For the purpose of Example 1, a catalyst pack of the type shown in the drawing was used in the manufacture of nitric oxides. The catalyst pack consisted of a total of five layers of woven platinum/rhodium wire gauze made from an alloy of platinum 5 wt% (based on the weight of the alloy) rhodium and two layers of an foraminous ceramics cloth. The catalyst pack was arranged, from the upstream side of the pack, with four layers of woven platinum/rhodium wire, two layers of an foraminous ceramics cloth and a further layer of woven platinum/rhodium wire. The five layers of the platinum/rhodium were made from wire of diameter 0.076 mm woven into a gauze of mesh size 1024 apertures cm$^{-2}$ which gives a gauze with an open area of 57%. The ceramics cloth consisted of a ceramics material composed of 62 wt% alumina, 24 wt% silica and 14 wt% boria formed into fibres of diameter 11 μm which in turn were spun into threads and woven to make a cloth of mesh size 50 apertures cm$^{-2}$ which gave the cloth an open area of 52.6%. The ceramic cloth had a coating of platinum 2.5 wt% (based on the ceramics cloth) deposited thereon by dipping the cloth in a solution of tetrammineplatinum(II) chloride which was then dried and the salt reduced to platinum by heating.

The performance of the catalyst pack was tested in the manufacture of nitric oxide as follows:

A reactant mixture consisting of air containing 10 volume % ammonia was passed through the catalyst pack at a pressure of 4 bar. The reactant mixture was heated to 270° C. before entry into the catalyst pack.

The conversion efficiency for the conversion of ammonia to nitric oxide is conventionally expressed in terms of the amount of nitric acid which can be obtained from the nitric oxide after it has been oxidised to nitrogen dioxide and dissolved in water. The amount of nitric acid which would be obtained for various reactant feed rates (assuming perfect conversion) was therefore determined and the conversion efficiency is given as a percentage of this.

For the purpose of Examples 2, 3, 4 and 5, the two ceramic layers were coated with platinum 5.0, 10, 16.5 and 25.7 wt% respectively (based on the ceramic layers) and the procedure of Example 1 repeated. The conversion efficiencies obtained are shown in Table 1.

For the purpose of Examples 6, 7, 8 and 9, the two ceramic layers were coated with palladium 6.0, 9.3, 16.5 and 23.0 wt% respectively (based on the ceramic layers) from a solution of tetramminepalladium(II) chloride (Pd(NH$_3$)$_4$Cl$_2$) and the procedure of Example 1 repeated. The conversion efficiencies obtained are shown in Table 1.

For the purpose of Example 10, the two ceramic layers were coated with platinum 9.7 wt% and rhodium 2.5 wt% (based on the ceramic layers) form a solution containing tetrammineplatinum(II) chloride and a second solution containing rhodium nitrate and the procedure of Example 1 repeated. The conversion efficiencies obtained are shown in Table 1.

For the purpose of Examples 11, 12 and 13, two ceramic layers were coated with platinum and rhodium as i Example 10. The coatings were as follow:

| Example | Platinum wt % | Rhodium wt % |
|---------|---------------|--------------|
| 11 | 17.8 | 2.4 |
| 12 | 18.1 | 3.4 |
| 13 | 18.0 | 6.3 |

The procedure of Example 1 was repeated and the conversion efficiencies obtained are shown in Table 1.

For the purpose of Example 14, the two ceramic layers were coated with platinum 8.0 wt% and palladium 2.5 wt% (based on the ceramic layers) from a solution of tetrammineplatinum(II) chloride and tetraaminepalladium(II) chloride and the procedure of Example 1 repeated. The conversion efficiencies obtained are shown in Table 1.

For the purposes of Example 15, the two ceramic layers were coated with platinum 14.0 wt%, palladium 6.0 wt% and rhodium 3.6 wt% from a solution of tetrammineplatinum(II) chloride, a second solution of tetramminepalladium(II) chloride and a third solution of rhodium nitrate and the procedure of Example 1 repeated. The conversion efficiencies are shown in Table 1.

For the purpose of Example 16, the two ceramic layers were fabricated from a ceramics cloth which consisted of a ceramics material composed of zirconia fibres woven into a cloth of mesh size 54 apertures cm$^2$ with an average open area of 31%. The ceramics cloth had a coating of platinum 19.2 wt% and rhodium 1.6 wt% (based on the ceramic cloth) deposited by dipping into a solution of tetrammineplatinum(II) chloride and a second solution of rhodium nitrate and then drying and heating to reduce the salts to platinum and rhodium. The procedure of Example 1 was repeated and the conversion efficiencies obtained are shown in Table 1.

For the purpose of Example 17, the two ceramic layers of zirconia, were coated with platinum 21.0 wt%, palladium 6.9 wt% and rhodium 1.4 wt% (based on the ceramic layers) from a solution containing tetrammineplatinum(II) chloride, a second solution containing tetramminepalladium(II) chloride and a third solution containing rhodium nitrate. The procedure of Example 1 was repeated and the conversion efficiencies obtained are shown in Table 1.

For the purposes of Comparative Example A, the procedure of Example 1 was repeated except that the ceramic layers were omitted from the catalyst assembly. The conversion efficiencies obtained are shown in Table 1.

For the purpose of Comparative Example B, the procedure of Example 1 was repeated except that the ceramic layers were not coated with a platinum group metal. The conversion efficiencies obtained are shown in Table 1.

For the purpose of Comparative Examples C and D, the procedure of Example 1 was repeat4ed except that the ceramic layers were omitted and replaced by three and five further layers of woven platinum/rhodium wire giving a pack comprising eight and ten conventional platinum/rhodium gauzes, respectively. The conversion efficiencies obtained are shown in Table 1.

TABLE 1

| Example | Coating of ceramic cloth | REACTANT FEED RATE (Tonnes $NH_3 m^{-2} day^{-1}$) Actual Conversion Efficiencies Achieved expressed as % of Perfect Conversion | |
| --- | --- | --- | --- |
| | | 12 | 16 |
| 1 | 2.5 wt % Pt | 80.6 | — |
| 2 | 5.0 wt % Pt | 92.3 | 93.8 |
| 3 | 10.0 wt % Pt | 94.4 | 93.3 |
| 4 | 16.5 wt % Pt | 95.9 | 93.5 |
| 5 | 25.7 wt % Pt | 90.2 | 93.0 |
| 6 | 6.0 wt % Pd | 93.9 | 93.9 |
| 7 | 9.3 wt % Pd | 96.4 | 92.9 |
| 8 | 16.5 wt % Pd | 83.8 | 95.2 |
| 9 | 23.0 wt % Pd | 87.7 | 94.5 |
| 10 | 9.7 wt % Pt 2.5 wt % Rh | 90.0 | 86.2 |
| 11 | 17.8 wt % Pt 2.4 wt % Rh | 96.0 | 95.4 |
| 12 | 18.1 wt % Pt 3.4 wt % Rh | 91.1 | 92.9 |
| 13 | 18.0 wt % Pt 6.3 wt % Rh | 85.0 | 94.7 |
| 14 | 8.0 wt % Pt 2.5 wt % Pd | 94.7 | 93.7 |
| 15 | 14.8 wt % Pt 6.0 wt % Pd 3.6 wt % Rh | 87.1 | 92.8 |
| 16 | 19.2 wt % Pt 2.6 wt % Rh | 95.1 | 95.2 |
| 17 | 21.0 wt % Pt 6.9 wt % Pd 1.4 wt % Rh | 94.7 | 94.1 |
| A | no ceramic layers | 81.5 | 78.7 |
| B | no coating | 89.0 | 83.4 |
| C | no ceramic layers | 92.5 | 95.6 |
| D | no ceramic layers | 95.5 | 94.5 |

A comparison of examples 1–17 with Examples A and B shows that the conversion efficiency obtained with a catalyst pack comprising a number of ceramic layers having a coating of a platinum group metal is improved compared to that obtained with a pack without such ceramic layers or uncoated ceramic layers. A comparison with Examples C and D shows the conversion efficiency achieved with a catalyst pack comprising five platinum/rhodium wire layers and two ceramic layers coated with platinum group metal with a flow rate of 12 tonnes $NH_3 m^{-2} day^{-1}$ is better than that obtained with eight platinum/rhodium wire gauzes and nearly as good as that obtained with ten, and for a flow rate of 16 tonnes $NH_3 m^{-2} day^{-1}$ is as good as that obtained with ten platinum/rhodium gauzes.

I claim:

1. A catalyst pack for the manufacture of nitric oxide by oxidising ammonia comprising at least one foraminous layer of elongate elements made from at least one platinum group metal or alloy thereof and at least one layer of foraminous ceramics material comprising intercrossing ceramic fibres which define the apertures of the foraminous material, said foraminous ceramics material having a coating of one or more platinum group metals or alloys or mixtures thereof.

2. A catalyst pack according to claim 1, wherein the coating comprises 1.5 to 70 wt% of a platinum group metal or alloy or mixture thereof.

3. A catalyst pack according to claim 1, wherein the coating comprises up to 1.5 wt% of one or more platinum group metals or alloys or mixtures thereof deposited by vapour deposition or sputtering.

4. A catalyst pack according to claim 2 or 3, wherein the coating comprises platinum, palladium or rhodium or mixtures or alloys thereof.

5. A catalyst pack according to claim 1, wherein the fibres make up a woven cloth.

6. A catalyst pack according to claim 1, wherein the open area of the foraminous ceramics material comprises from 10 to 60% of the area thereof.

7. A catalyst pack according to claim 1, wherein the ceramics material comprises one or more oxides, borides, carbides, silicides, nitrides and/or silicates of aluminium, silicon, zirconium, boron, magnesium, titanium, yttrium, beryllium, thorium, manganese, lanthanum, scandium, calcium, uranium, chromium, niobium and hafnium.

8. A catalyst pack according to claim 7, wherein the ceramics material comprises alumina,
 0 to 30 wt% silica and
 0 to 15 wt% boria.

9. A catalyst pack according to claim 7, wherein the ceramics material comprises zirconia.

10. A process for the manufacture of nitric oxide by oxidising ammonia in the presence of a catalyst pack, which comprises at least one foraminous layer of elongate elements made from at least one platinum group metal or alloy thereof and at least one layer of foraminous ceramics material comprising intercrossing ceramics fibres which define the apertures of the foraminous material, said foraminous ceramics material having a coating of one or more platinum group metals or alloys or mixtures thereof.

11. A process according to claim 10, wherein the said at least one layer of the ceramics material is positioned in the downstream portion of the pack.

12. A process according to claim 11, wherein the catalyst pack comprises, from the upstream thereof side, four foraminous layers of elongate elements, two layers of foraminous ceramics material and a further foraminous layer of elongate elements.

* * * * *